US009450866B2

(12) United States Patent
He et al.

(10) Patent No.: US 9,450,866 B2
(45) Date of Patent: Sep. 20, 2016

(54) FORWARDING TABLE PERFORMANCE CONTROL IN SDN

(71) Applicant: Telefonaktiebolaget L M Ericsson (publ), Stockholm (SE)

(72) Inventors: Jiang He, Beijing (CN); Xiaobing Lai, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 90 days.

(21) Appl. No.: 14/329,037

(22) Filed: Jul. 11, 2014

(65) Prior Publication Data

US 2016/0014023 A1  Jan. 14, 2016

(51) Int. Cl.
*H04L 12/28* (2006.01)
*H04L 12/50* (2006.01)
(Continued)

(52) U.S. Cl.
CPC ............... *H04L 45/54* (2013.01); *H04L 45/64* (2013.01)

(58) Field of Classification Search
CPC ............... H04L 12/00; H04L 41/5009; H04L 41/5032; H04L 41/5035; H04L 41/5058; H04L 47/70; H04L 12/28; H04L 45/745; H04L 47/2483; H04L 49/25; H04L 49/00; H04L 49/50; H04L 45/14; H04L 45/28; H04L 45/02; H04L 47/12; H04L 45/24; G06F 17/30289
USPC .......... 370/395.21, 400, 389, 392, 351, 252, 370/386, 384, 382, 410, 411, 412, 390, 360
See application file for complete search history.

(56) References Cited

U.S. PATENT DOCUMENTS 7,606,140 B2 * 10/2009 Golla ...................... H04L 45/02
                                                                370/216
7,646,759 B2 *  1/2010 Hegde ...................... H04L 45/50
                                                                370/351
(Continued)

FOREIGN PATENT DOCUMENTS

EP      2753032 A1     7/2014

OTHER PUBLICATIONS

Wang, et al., "A fast table update scheme for high-performance IP forwarding," Parallel and Distributed Systems, 2001, ICPADS 2001, Proceedings. 8th International Conference, Jun. 26-29, 2001, IEEE, pp. 592-597.

(Continued)

*Primary Examiner* — Hanh N Nguyen
(74) *Attorney, Agent, or Firm* — Nicholson De Vos Webster & Elliott, LLP

(57) ABSTRACT

Exemplary methods for controlling forwarding table performance include a first network device in a control plane determining a first performance requirement of a first forwarding table in a forwarding plane based on an overall performance requirement of a plurality forwarding tables in the forwarding plane. In one embodiment, in response to determining the first forwarding table in the forwarding plane can be generated to satisfy the first performance requirement, the methods include the first network device sending a first message that includes the first performance requirement to a second network device in the forwarding plane, causing the second network device to generate the first forwarding table that satisfies the first performance requirement. In one embodiment, the exemplary methods include the second network device generating the first forwarding table that satisfies the first performance requirement included in the first message.

32 Claims, 6 Drawing Sheets

(51) Int. Cl.
H04L 12/741 (2013.01)
H04L 12/715 (2013.01)

(56) References Cited

U.S. PATENT DOCUMENTS

| | | | | |
|---|---|---|---|---|
| 8,429,143 | B2* | 4/2013 | Ellison | G06F 17/30949 |
| | | | | 707/665 |
| 8,615,009 | B1* | 12/2013 | Ramamoorthi | H04L 45/745 |
| | | | | 370/389 |
| 2013/0163475 | A1 | 6/2013 | Beliveau et al. | |
| 2015/0012484 | A1* | 1/2015 | Jindal | H04L 47/2483 |
| | | | | 707/609 |
| 2016/0014028 | A1* | 1/2016 | He | H04L 45/745 |
| | | | | 370/392 |
| 2016/0072696 | A1* | 3/2016 | He | H04L 45/021 |
| | | | | 370/254 |

OTHER PUBLICATIONS

Ali, et al., "Node-ID Based Resource Reservation Protocol (RSVP) Hello: A Clarification Statement", Network Working Group, Network Working Group, Request for Comments: 4558, The Internet Society, (Jun. 2006), 8 pages.
Andersson, L., et al., "LDP Specification", Network Working Group, Request for Comments: 5036, (Oct. 2007), 136 pages.
Awduche, D., et al., "RSVP-TE: Extensions to RSVP for LSP Tunnels", Network Working Group, Request for Comments: 3209, The Internet Society, http://tools.ietf.org/html/rfc3209, (Dec. 2001), 62 pages.
Babiarz, J., et al., "Configuration Guidelines for DiffServ Service Classes", Network Working Group, Request for Comments: 4594, The Internet Society, (Aug. 2006), 57 pages.
Baker, F., "A Differentiated Services Code Point (DSCP) for Capacity-Admitted Traffic", Internet Engineering Task Force (IETF), Request for Comments: 5865, IETF Trust, (May 2010), 14 pages.
Baker, F., et al., "Management Information Base for the Differentiated Services Architecture", Network Working Group, Request for Comments: 3289, The Internet Society, (May 2002), 116 pages.
Berger, L., "Generalized Multi-Protocol Label Switching (GMPLS) Signaling Resource ReserVation Protocol—Traffic Engineering (RSVP-TE) Extensions", Network Working Group, Request for Comments: 3473, http://tools.ietf.org/html/rfc3473, (Jan. 2003), 42 pages.
Bernet, Y, et al., "An Informal Management Model for Diffserv Routers", Network Working Group, Request for Comments: 3290, The Internet Society, (May 2002), 56 pages.
Black, D., "Differentiated Services and Tunnels", Network Working Group, Request for Comments: 2983, The Internet Society, (Oct. 2000), 14 pages.
Black, D., et al., "Per Hop Behavior Identification Codes", Network Working Group, Request for Comments: 3140, The Internet Society, (Jun. 2001), 8 pages.
Blake, S., et al., "An Architecture for Differentiated Services", Network Working Group, Request for Comments 2475, The Internet Society, (Dec. 1998), 37 pages.
Borman, D., et al., "IPv6 Jumbograms", Network Working Group, Request for Comments: 2675, The Internet Society, (Aug. 1999), 9 pages.
Braden, et al., "Resource ReSerVation Protocol (RSVP)—Version 1 Functional Specification", Network Working Group, Request for Comments: 2205, (Sep. 1997), 113 pages.
Chan, K., et al., "Differentiated Services Quality of Service Policy Information Base", Network Working Group, Request for Comments: 3317, The Internet Society, (Mar. 2003), 96 pages.
Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.
Coltun, R., et al., "OSPF for IPv6", Network Working Group, Request for Comments: 5340, (Jul. 2008), 95 pages.
Davie, B., et al., "An Expedited Forwarding PHB (Per-Hop Behavior)", Network Working Group, Request for Comments:3246, The Internet Society, (Mar. 2002), 16 pages.

Deering, et al., "Internet Protocol, Version 6 (IPv6) Specification", Network Working Group, Request for Comments: 2460, The Internet Society, (Dec. 1998), 39 pages.
Eggert, L., et al., "Unicast UDP Usage Guidelines for Application Designers", Network Working Group, Request for Comments: 5405, IETF Trust, (Nov. 2008), 27 pages.
Fenner, B., et al., "Management Information Base for the User Datagram Protocol (UDP)", Network Working Group, Request for Comments: 4113, The Internet Society, (Jun. 2005), 19 pages.
Grossman, D., "New Terminology and Clarification for Diffserv", Network Working Group, Request for Comments: 3260, The Internet Society, (Apr. 2002), 10 pages.
Haleplidis, et al., "SDN Layers and Architecture Terminology, draft-haleplidis-sdnrg-layer-terminology-04", SDNRG Internet-Draft, Internet Engineering Task Force (IETF), (Mar. 3, 2014), 25 pages.
Hedrick, C., "Routing Information Protocol", Network Working Group, Request for Comments: 1058, (Jun. 1988), 34 pages.
Heinanen, J., et al., "Assured Forwarding PHB Group", The Internet Society, RFC 2597, (Jun. 1999), 11 pages.
Housley, "Using Advanced Encryption Standard (AES) CCM Mode with IPsec Encapsulating Security Payload (ESP)", Network Working Group, Request for Comments: 4309, The Internet Society, (Dec. 2005), 14 pages.
Kent, et al., "Security Architecture for the Internet Protocol", Network Working Group, Request for Comments: 4301, The Internet Society, (Dec. 2005), 102 pages.
Kompella, et al., "Procedures for Modifying the Resource reSerVation Protocol (RSVP)", Network Working Group, Request for Comments: 3936, The Internet Society, (Oct. 2004), 8 pages.
Malkin, G., "RIP Version 2", Network Working Group, Request for Comments: 2453, The Internet Society, (Nov. 1998), 40 pages.
Malkin, et al. "RIPng for IPv6", Network Working Group, Request for Comments: 2080, (Jan. 1997), 20 pages.
Moy, J., "OSPF Version 2", Network Working Group, Request for Comments: 2328, The Internet Society, (Apr. 1998), 245 pages.
Nichols, K., et al., "Definition of Differentiated Services Per Domain Behaviors and Rules for their Specification", Network Working Group, Request for Comments: 3086, The Internet Society, (Apr. 2001). 24 pages.
Nichols, K., et al., "Definition of the Differentiated Services Field (DS Field) in the IPv4 and IPv6 Headers", Network Working Group, Request for Comments: 2474, The Internet Society, (Dec. 1998), 20 pages.
Oran, D., "OSI ISIS Intradomain Routing Protocol", Network Working Group, Request for Comments: 1142, (Feb. 1990), 157 pages.
Polk, et al., "A Resource Reservation Protocol (RSVP) Extension for the Reduction of Bandwidth of a Reservation Flow", Network Working Group, Request for Comments: 4495, The Internet Society, (May 2006), 22 pages.
Postel, J., "Transmission Control Protocol", STD 7, RFC 793, Internet Standard, (Sep. 1981), 91 pages.
Postel, J., "User Datagram Protocol", Request for Comments: 768, (Aug. 28, 1980), 3 pages.
Rekhter, Y., et al., "A Border Gateway Protocol 4 (BGP-4)", Network Working Group, Request for Comments: 4271, (Jan. 2006), 105 pages.
Rosen, et al., "BGP/MPLS IP Virtual Private Networks (VPNs)", Network Working Group, Request for Comments: 4364, The Internet Society, (Feb. 2006), 47 pages.
Shenker, et al., "Specification of Guaranteed Quality of Service", Network Working Group, Request for Comments: 2212, (Sep. 1997), 20 pages.
Socolofsky, T., et al., "A TCP/IP Tutorial", Network Working Group, Request for Comments: 1180, (Jan. 1991), 28 pages.
Wroclawski, J., "Specification of the Controlled-Load Network Element Service", Network Working Group, Request for Comments: 2211, (Sep. 1997), 20 pages.
Wroclawski, J., "The Use of RSVP with IETF Integrated Services",Network Working Group, Request for Comments: 2210, (Sep. 1997), 34 pages.

\* cited by examiner

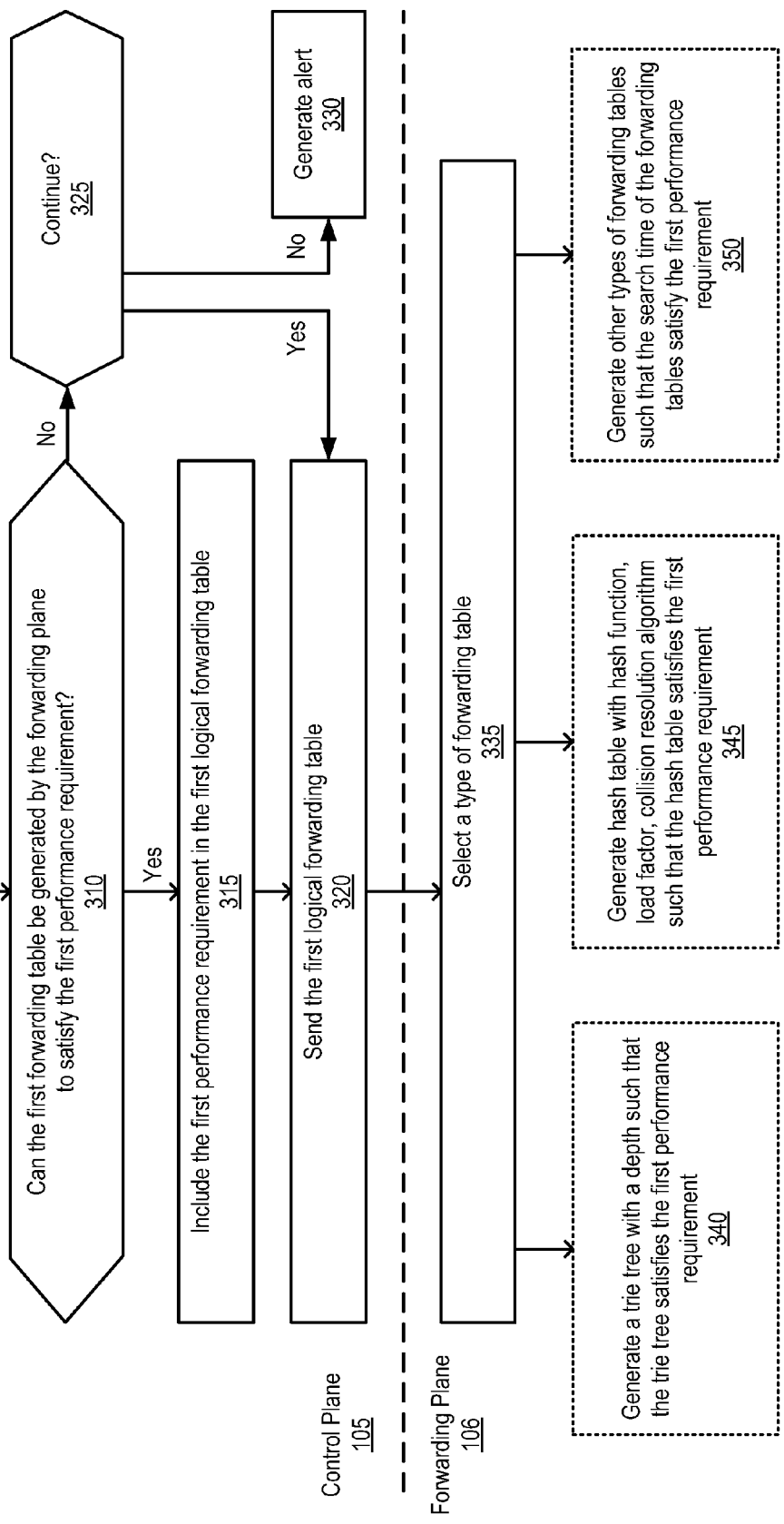

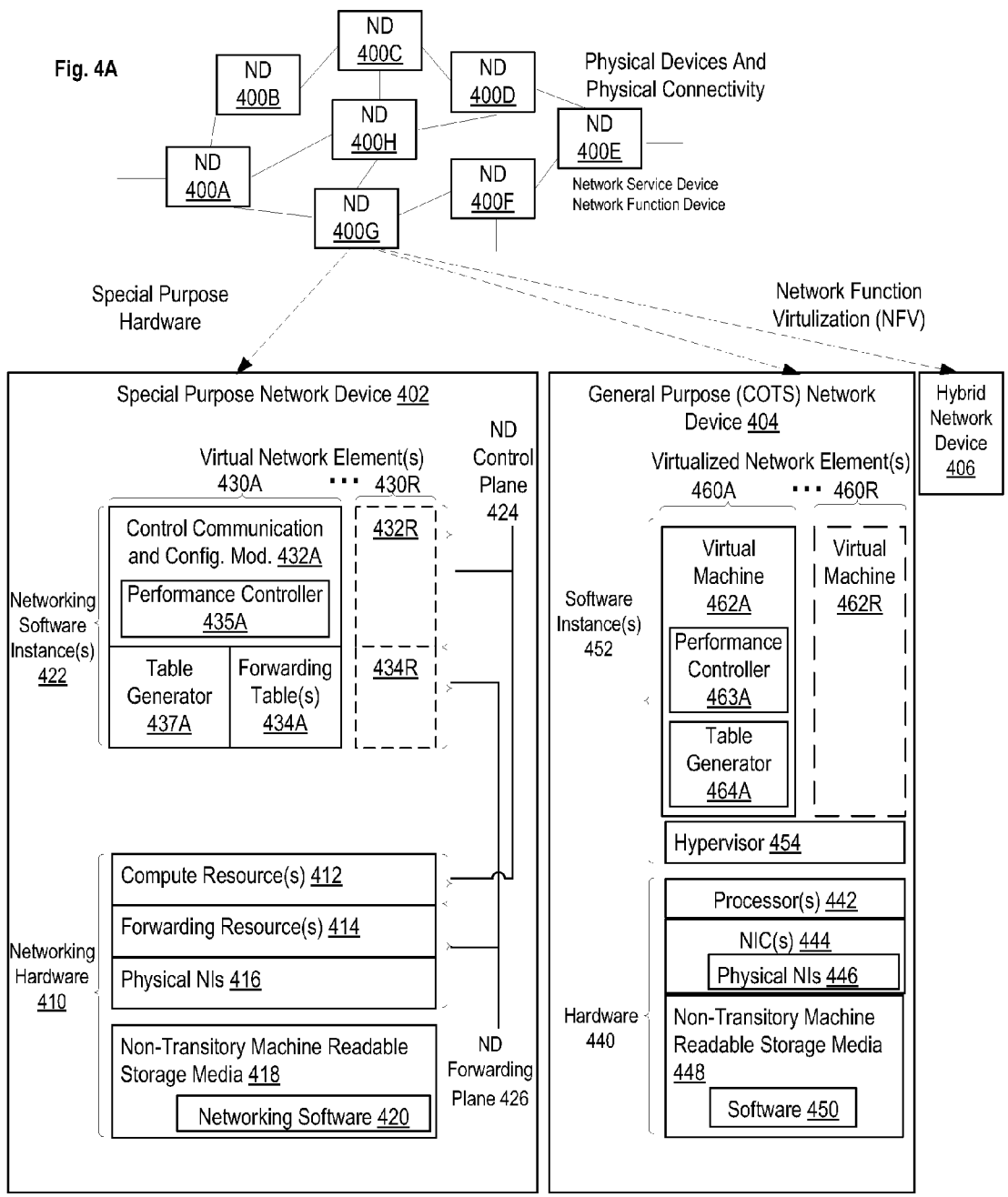

FORWARDING TABLE PERFORMANCE CONTROL IN SDN

FIELD

Embodiments of the invention relate to the field of packet networks; and more specifically, to forwarding table performance control in software defined networking (SDN).

BACKGROUND

Software defined networking (SDN) is an approach to networking that enables applications to communicate with and manipulate the control software of network devices and resources. A key aspect of SDN is the abstraction between the forwarding and the control/management planes in order to separate them and provide applications with the means necessary to control the network. This separation provides faster innovation cycles at both planes.

In SDN, the control plane and the forwarding plane communicate via a southbound interface using protocols such as Forwarding and Control Element Separation (ForCES), Network Configuration Protocol (NETCONF), and Interface to the Routing System (I2RS). Through the southbound interface, the control plane manages the forwarding plane behavior by manipulating the corresponding forwarding tables.

A conventional forwarding plane includes a pipeline of functional blocks to handle packets from ingress to egress. The corresponding forwarding tables attached to the functional blocks include ingress/egress Access Control List (ACL), Forwarding Information Base (FIB), Label FIB (LFIB), etc.

The FIBs are typically implemented in Static Random Access Memory (SRAM) or Dynamic Random Access Memory (DRAM) as trie-trees (also commonly known as radix trees). ACL tables are also typically implemented as multiple combined trie-tree based algorithms (e.g., hierarchical trie, set-pruning trie, etc.) A typical trie tree includes multiple levels of nodes. The number of levels of nodes defines the depth of the trie tree, which defines the number of steps for the trie tree to complete a search. The depth of a trie tree depends on its strides planning. As used herein, a "stride" refers to the amount of information (e.g., the number of bits) that are compared/searched during each step (i.e., at each level of the trie tree). Thus, larger strides results in smaller depths.

The FIBs can be implemented as hash tables, which may employ different hashing functions. Some hash tables may result in collisions. As used herein, a "hashing collision" refers to the phenomenon where an input maps to multiple outputs. Thus, hashing may involve two steps. The first step is to find the result. In some instances, hashing requires a second step to be performed, i.e., collision resolution. Different collision resolution algorithms may be utilized by a hash table. Further, each hash table is associated with a load factor. As used herein, a "load factor" refers to the number of hash entries divided by the number of buckets. If the load factor is kept reasonable, the hash table should perform well, provided the hashing is good. If the load factor grows too large, the hash table will become slow, or it may fail to work altogether. Thus, the performance of hashing tables depends on the hashing function, the collision resolution algorithm, the load factor, or any combination thereof.

When the forwarding plane includes multiple forwarding tables, the overall performance of the forwarding tables depends on the performance of all forwarding tables in the pipeline. If one forwarding table becomes the bottleneck, then the entire pipeline of forwarding tables is impacted. In some networking applications, control of the performance of the forwarding tables is required. Conventionally, there is no mechanism for controlling the performance of these forwarding tables.

Further, in some network configurations, multiple virtual routers are executed by the same processor, sharing the same hardware resource (e.g., memory) for implementing the forwarding tables to satisfy different Service Level Agreements (SLAs). In such configurations, forwarding tables with higher priorities may over utilize the hardware resources and starve the lower priority forwarding tables. Conventionally, there is no mechanism for controlling the resource consumption by the forwarding tables.

SUMMARY

Exemplary methods performed by a first network device operating in a control plane for distributing performance requirements to a second network device operating in a forwarding plane include determining a first performance requirement of a first forwarding table in the forwarding plane based on an overall performance requirement of a plurality forwarding tables in the forwarding plane.

In one embodiment, the methods include determining whether the first forwarding table in the forwarding plane can be generated to satisfy the first performance requirement, and in response to determining the first forwarding table in the forwarding plane can be generated to satisfy the first performance requirement, sending a first message that includes the first performance requirement to the second network device, the first message causing the second network device to generate the first forwarding table that satisfies the first performance requirement.

According to one embodiment, the first message causes the second network device to generate a trie tree with a depth such that the trie tree satisfies the first performance requirement. In another embodiment, the first message causes the second network device to generate a hash table with a load factor such that the hash table satisfies the first performance requirement. In yet another embodiment, the first message causes the second network device to generate the hash table with a collision resolution algorithm such that the hash table satisfies the first performance requirement.

In one embodiment, the methods further include in response to determining the first forwarding table is causing the plurality of forwarding tables in the forwarding plane to fail to satisfy the overall performance requirement after the first forwarding table has been generated based on the first performance requirement, determining a second performance requirement of the first forwarding table, wherein the second performance requirement is a stricter performance requirement than the first performance requirement. In one such embodiment, the methods further include sending a second message that includes the second performance requirement to the second network device, the second message causing the second network device to re-generate the first forwarding table to satisfy the second performance requirement.

Exemplary methods performed by a first network device operating in a forwarding plane for generating forwarding tables based on performance requirements received from a second network device operating in a control plane include receiving a first message that includes a first performance requirement of a first forwarding table from the second network device, and generating the first forwarding table that satisfies the first performance requirement included in the first message.

In one embodiment, the methods include generating a trie tree with a depth such that the trie tree satisfies the first performance requirement included in the first message. In another embodiment, the methods include generating a hash table with a load factor such that the hash table satisfies the first performance requirement included in the first message. In yet another embodiment, the methods include generating the hash table with a collision resolution algorithm such that the hash table satisfies the first performance requirement included in the first message.

BRIEF DESCRIPTION OF THE DRAWINGS

The invention may best be understood by referring to the following description and accompanying drawings that are used to illustrate embodiments of the invention. In the drawings:

FIG. 3 is a flow diagram illustrating a method for distributing performance requirements of forwarding tables according to one embodiment.

FIG. 4A illustrates connectivity between network devices (NDs) within an exemplary network, as well as three exemplary implementations of the NDs, according to some embodiments of the invention.

FIG. 4B illustrates an exemplary way to implement the special-purpose network device 402 according to some embodiments of the invention.

DESCRIPTION OF EMBODIMENTS

Figure 1:
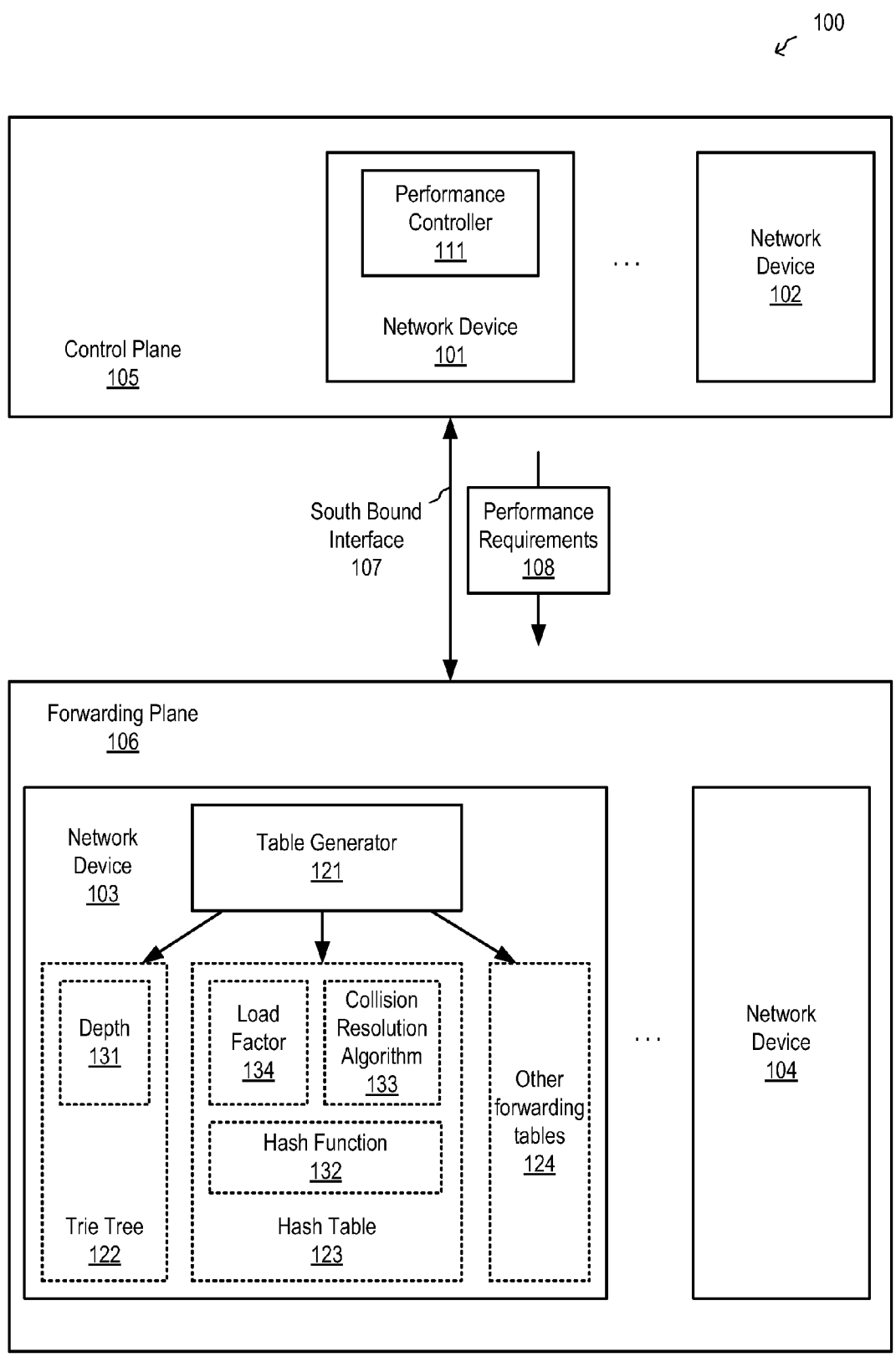
FIG. 1 is a block diagram illustrating an SDN network according to one embodiment.

The following description describes methods and apparatuses for controlling the performance of forwarding tables in the forwarding plane In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A routing table, or routing information base (RIB), is a data table stored in a router or a networked computer that lists the routes to particular network destinations, and in some cases, metrics (distances) associated with those routes. The RIB is where all IP routing information is stored. It is not specific to any routing protocol, but rather a repository where all the routing protocols place all of their routes. Routes are inserted into the RIB whenever a routing protocol running on the router learns a new route. When a destination becomes unreachable, the route is first marked unusable and later removed from the RIB as per the specifications of the routing protocol they were learned from. The RIB is not used for forwarding IP datagrams, nor is it advertised to the rest of the network to which the router is attached.

A Forwarding Information Base (FIB) is used to make IP destination prefix-based switching decisions. The FIB contains the interface identifier and next hop information for each reachable destination IP prefix. The FIB is conceptually similar to a routing table. It maintains a mirror image of the forwarding information contained in the IP routing table.

When IP routes are copied from routing table to FIB, their next hops are resolved, outgoing interfaces are computed, and multiple entries are created when the next-hop resolution results in multiple paths to the same destination. The number of entries within a FIB is one of the key elements that may influence the forwarding performance of a router. Generally, the more entries within the FIB, the longer it could take to find the longest matching network prefix within the forwarding information base. This architecture of having a RIB and a FIB separates the control plane function of the routing table from the forwarding plane function of the forwarding table. This separation of control and forwarding provides uninterrupted performance.

Access Control Lists (ACLs) are filters that enable a router to control which routing updates or packets are permitted or denied in or out of a network. ACLs are used by network administrators to filter traffic and to provide extra security for their networks. A router acts as a packet filter when it forwards or denies packets according to ACL rules (herein simply referred to as rules). As used herein, a "rule" refers to some characteristics of a packet which is used to determine what type of action should be taken for the packet. A rule can be the source and destination IP addresses, the source and destination port, the source and destination media access control (MAC) addresses, the protocol of the packet, or any combination thereof. Each rule is mapped to an action. Here, an "action" refers to some operation that is to be performed on the packet with characteristics that match the rule. For example, an action can be "permit", which allows the packet to be forwarded. An action can also be "deny", which causes the packet to be discarded. The rules can be mapped to other actions.

In some architecture, the FIB forwarding table is implemented as a trie tree (e.g., in RAM), which serves as a lookup table of IP prefixes. An IP address can be represented as A.B.C.D/n, where "/n" is called the IP prefix or network prefix, and the value "n" is the prefix length. The IP prefix identifies the number of significant bits used to identify a network. For example, 192.168.1.0/24 means the first 24 bits are used to represent the network and the remaining 8 bits are used to identify hosts. In this example, the prefix length is 24. In a typical network, multiple prefixes may have the same prefix length. For example, prefixes 192.168.1.0/24, 192.168.2.0/24, 192.168.3.0/24 all have the same prefix length of 24.

The performance of a trie tree is determined by its depth. For example, the number of steps required by a trie tree to complete a search depends on its depth. The depth of a trie tree, in turn, is determined by its strides planning. A stride, as used herein, refers to the amount of information (e.g., the number of bits) that is searched at the same time at each level of the tree. The performance of a trie tree can be increased simply by increasing its strides. Increasing the strides, however, also increases hardware resource consumption. The strides can be tailored to achieve a particular depth without wasting resources (e.g., memory) if the forwarding plane is aware of the target performance requirement. A conventional control plane, however, does not provide the performance requirement to the forwarding plane.

In some architecture, the LFIB forwarding table can be implemented as a hash table. The performance of a hash table is determined based on its hashing function, load factor, collision resolution algorithm, or any combination thereof. Typically, the hashing function, load factor, and/or collision resolution algorithm with higher performance (i.e., less number of steps to complete a search) incur more resources. The hashing function, load factor, and/or collision resolution algorithm can be selected to achieve a particular performance without wasting resources (e.g., memory) if the forwarding plane is aware of the target performance requirement. A conventional control plane, however, does not provide the performance requirement to the forwarding plane.

Embodiments of the present invention overcome these limitations by providing mechanisms for a control plane to send performance requirements to a forwarding plane.

Techniques for controlling the performance of forwarding tables in a forwarding plane are described herein. According to one embodiment, a first network device operating in a control plane determines an overall performance requirement of the forwarding tables in the forwarding plane. Based on the determined overall performance requirement, the first network device determines the performance requirement of one or more of the forwarding tables in the forwarding plane, such that collectively, the forwarding tables satisfy the overall performance requirement.

In one embodiment, the first network device sends the performance requirements of one or more forwarding tables to a second network device operating in the forwarding plane. In such an embodiment, the second network device utilizes the received performance requirements to generate the forwarding tables such that each forwarding table satisfies its performance requirement. In this way, the performance of and resource consumption by the forwarding tables can be controlled by the first network device.

FIG. 1 is a block diagram illustrating network 100 according to one embodiment. Network 100 includes control plane 105 and forwarding plane 106. In the illustrated embodiment, control plane 105 includes network devices 101-102. It shall be understood, however, that more network devices can be included as part of control plane 105. Forwarding plane 106 includes network devices 103-104. It shall be understood, however, that more network devices can be included as part of forwarding plane 106. In one embodiment, network devices 101-102 of control plane 105 communicate with network devices 102-103 of forwarding plane 106 via southbound interface 107 using protocols such as Forwarding and Control Element Separation (ForCES), Network Configuration Protocol (NETCONF), and Interface to the Routing System (I2RS). Other protocols, however, can be utilized to implement southbound interface 107 without departing from the broader scope and spirit of the present invention.

A conventional control plane does not have any mechanism for distributing the performance requirements of the forwarding tables to a conventional forwarding plane. As a result, the forwarding tables in the conventional forwarding plane can oftentimes fail to satisfy the performance required by the network applications under SDN where the forwarding table is usually separated from the control plane. Conversely, without information of the performance requirements, the forwarding plane can oftentimes be overly aggressive with the performance, thus wasting resources (e.g., memory, etc.) Further, even if most of the forwarding tables aggressively exceed the performance requirements, all it takes is one forwarding table to fail to satisfy the performance requirements for the entire network architecture to break down. Thus, in the worst case scenario, a conventional network architecture can fail to satisfy the performance requirements while at the same time be wasting resources. Embodiments of the present invention overcome these limitations by providing techniques for distributing performance requirements.

According to one embodiment, network device 101 includes performance controller 111. Performance controller 111 is to determine an overall performance requirement of the forwarding tables in forwarding plane 106, such as, for example, trie tree 122, hash table 123, and other forwarding tables 124. Here, other forwarding tables 124 refer other forwarding tables that can be configured to meet different performance requirements. In one embodiment, once the overall performance requirement is determined, performance controller 111 is to determine a performance requirement of one or more forwarding tables in forwarding plane 106.

According to one embodiment, once the performance requirements are determined, performance controller 111 sends the performance requirements to network device 103, for example, as part of performance requirements 108. In one embodiment, performance requirements 108 include the requirements in terms of time complexity. The time complexity of an algorithm quantifies the amount of time taken by the algorithm to run as a function of the length of the string representing the input. The time complexity of an algorithm is commonly expressed using the big O notation. Time complexity is commonly estimated by counting the number of elementary operations performed by the algorithm, where an elementary operation takes a fixed amount of time to perform. Thus, the amount of time taken and the number of elementary operations performed by the algorithm differ by at most a constant factor. One having ordinary skill in the art would recognize that various other conventions may be utilized to represent the performance requirements.

According to one embodiment, network device 103 includes table generator 121 for generating forwarding tables, such as, for example, trie tree 122, hash table 123, and other forwarding tables 124. In one embodiment, table generator 121 is to generate forwarding tables that satisfy performance requirements 108. In one embodiment, table generator 121 determines which type of forwarding table to generate. In an alternative embodiment, performance controller 111 determines which type of forwarding table to generate, and sends such information to table generator 121, for example, as part of performance requirements 108.

In one embodiment, table generator 121 generates trie tree 122 that satisfies requirements 108. For example, trie tree 122 may implement a FIB or an ACL table. Trie tree 122, however, can implement a lookup table for any function. A trie tree is an ordered tree data structure that is used to store a dynamic set or associative array where the keys are usually strings. Unlike a binary search tree, no node in the tree stores the key associated with that node. Instead, the node's position in the tree defines the key with which it is associated. All the descendants of a node have a common prefix of the string associated with that node, and the root is associated with the empty string. Values are normally not associated with every node, only with leaves and some inner nodes that correspond to keys of interest. Though trie trees are most commonly keyed by character strings, they don't need to be. The same algorithms can easily be adapted to serve similar functions of ordered lists of any construct, e.g., permutations on a list of digits or shapes. In particular, a bitwise trie tree is keyed on the individual bits making up a short, fixed size of bits such as an integer number, memory address, an IP address, etc.

In one embodiment, the performance of trie tree 122 is defined by its depth 131. Depth 131 refers to the number of levels of nodes. Depth 131 defines the number of steps required by trie tree 122 to complete a search. Depth 131 is defined by the strides of each level. A stride, as used herein, refers to the amount of information (e.g., the number of bits) that is searched at the same time at each level of the tree. The performance of trie tree 122 can be increased (i.e., depth 131 can be reduced) simply by increasing the strides. Increasing the strides, however, also increases hardware resources consumption. In one embodiment, based on performance requirements 108, table generator 121 may determine depth 131 such that resource (e.g., memory) consumption by trie tree 122 is minimized, while at the same time, satisfying performance requirements 108. For example, depth 131 may be set to the time complexity included in performance requirements 108. Thus, contrary to a conventional network architecture, embodiments of the present invention enables control plane 105 (e.g., performance controller 111 of network device 101) to control the performance of trie tree 122, and at the same time, enables forwarding plane 106 (e.g., table generator 121 of network device 103) to minimize resource consumption because forwarding plane 106 is aware of what the performance target is.

Figure 2:
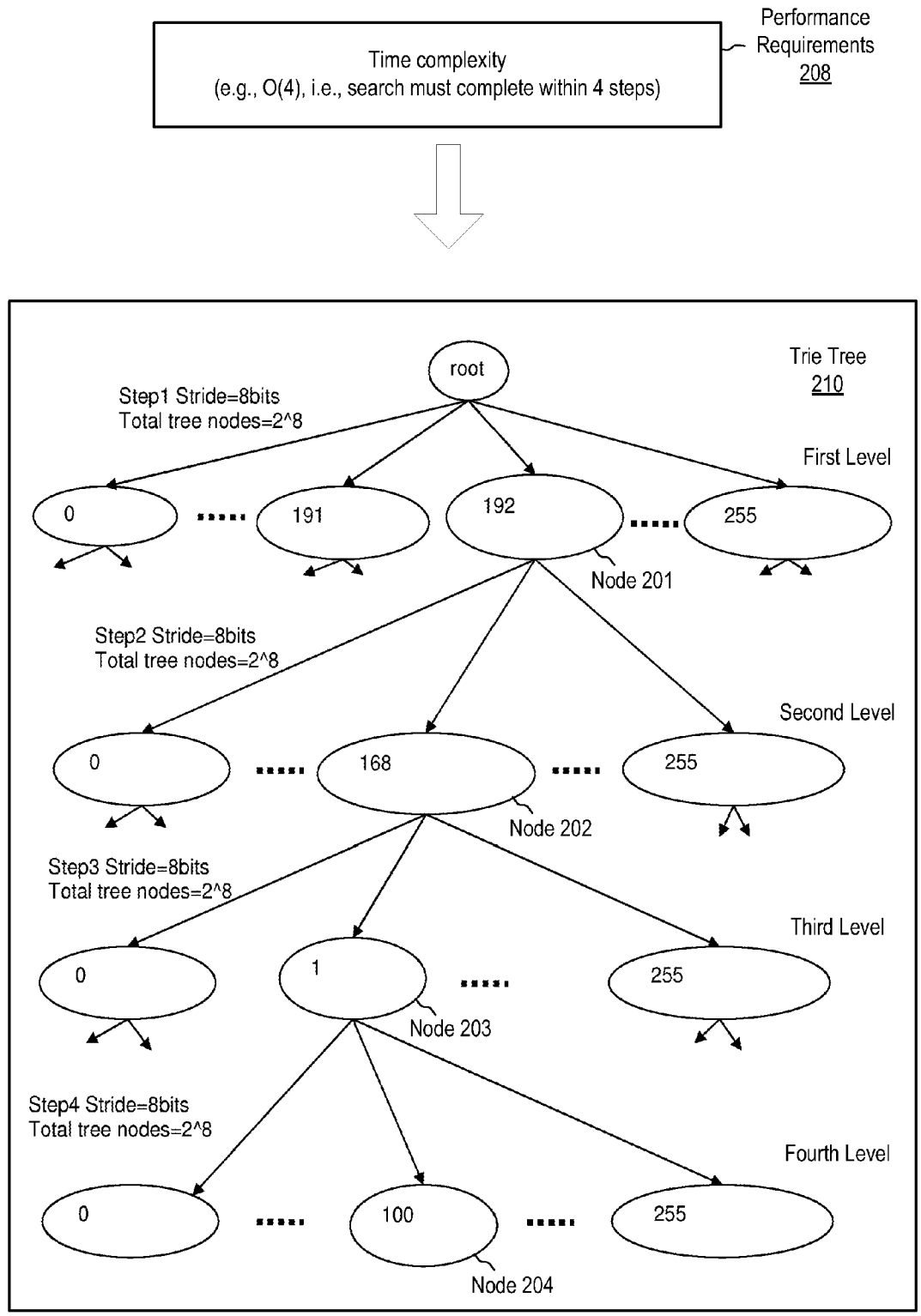
FIG. 2 is a block diagram illustrating a trie tree generated based on performance requirements distributed by a control plane, according to one embodiment.

FIG. 2 is a block diagram illustrating table generator 121 generating trie tree 210 based on performance requirements 208, according to one embodiment. FIG. 2 assumes that table generator 121 has received performance requirements 208 from performance controller 111. Performance requirements 208 indicate that the forwarding table must complete its search within O(4), i.e., a time complexity of 4 steps.

According to one embodiment, table generator 121 designs trie tree 210 with a depth that equals the time complexity included in performance requirements 208 (in this example, 4). In one embodiment, the stride k of each level is k=W/D, where W is the key length, and D is the maximum number of steps (i.e., time complexity). Assuming IPv4, in this example, stride k=32/4=8 bits. Thus, each level of trie tree 210 is 8 bits. The memory consumption is defined by $O(2^k*N*(W/k))$. Thus, in the above example, the memory requirement is $O(2^8*N*4)$, where N is the number of entries. The depth determination mechanism described above is for illustrative purposes, and not intended to be limitations of the present invention. Other depths can be selected based on the performance requirements. It shall be further appreciated that in some instances, the depth may be selected such that the strides are not the same at all levels of the trie tree. For example, one or more levels (e.g., the last level) may have a stride that is different from one or more other levels of the trie tree.

An example of a lookup process utilizing trie tree 210 will now be described. Assume that network device 103 receives a packet with a source IP address 192.168.1.100, and that network device 103 must search for this source IP address in trie tree 210. As a first step, network device 103 searches the first set of bits (comprising of 8 bits) of the source IP address (i.e., 192) in the first level because the stride of the first level is 8. In this example, network device 103 locates "192" at node 201. As a second step, network device 103 searches a second set of bits (comprising of 8 bits) of the source IP address (i.e., 168) in the second level because the stride of the second level is 8. In this example, network device 103 locates "168" at node 202.

As a third step, network device 103 searches a third set of bits (comprising of 8 bits) of the source IP address (i.e., 1) in the third level because the stride of the third level is 8. In this example, network device 103 locates "1" at node 203.

As a fourth step, network device 103 searches a fourth set of bits (comprising of 8 bits) of the source IP address (i.e., 100) in the fourth level because the stride of the fourth level is 8. In this example, network device 103 locates "100" at node 204. Thus, the input source IP address 192.168.1.100 is located in trie tree 210 within 4 steps. The located node typically maps to information/characteristics associated with the input key. For example, node 204 can map to an output port, so that input traffic with the source IP address 192.168.1.100 is forwarded to the identified output port.

Note that without the benefits of performance requirements 208, a conventional trie tree may be implemented with more levels, thus violating the performance requirements of the control plane. Conversely, without the benefits of performance 208, a conventional trie tree can be implemented with fewer levels, thus wasting of resources by being too aggressive with the performance.

Referring now back to FIG. 1. In one embodiment, table generator 121 generates hash table 123 that satisfies requirements 108. For example, hash table 123 may implement a label FIB. Hash table 123, however, can implement a lookup table for any function. A hash table, as used herein, is a data structure used to implement an associative array, a structure that can map keys to values. A hash table uses a hash function to compute an index into an array of buckets or slots, from which the correct value can be found. The value typically maps to information/characteristics associated with the input key.

According to one embodiment, table generator 121 generates hash table 123 by determining hash function 132 such that hash table 123 satisfies performance requirements 108. A hash table may employ one of various hash functions. A hash function, as used herein, is any function that maps data of arbitrary length to data of a fixed length. Commonly known hash functions include, for example, SHA-0, SHA-1, SHA-2, SHA-3, MD5, etc. The performance of a hash table is determined in part by its hash function because the hash function requires one or more steps to perform the hashing.

According to one embodiment, table generator 121 generates hash table 123 by determining collision resolution algorithm 133 such that hash table 123 satisfies performance requirements 108. Ideally, a hash function will assign/map each key to a unique bucket. For example, if all keys are known ahead of time, a perfect hash function can be utilized to create a perfect hash table that has no collisions. Here, a "hash collision" refers to different keys hashing/mapping to the same bucket. Perfect hashing, however, is rarely achievable in practice. Instead, most hash table designs assume that hash collisions will occur, and accommodate for them by including a hash collision resolution algorithm. Each hash collision resolution algorithm has a different performance (i.e., the number of steps required to resolve a hash collision varies depending on the algorithm). Thus, the performance of a hash table is also determined in part by the hash collision resolution algorithm utilized by the hash table because the collision resolution algorithm requires one or more steps to resolve the conflict/collision. Commonly known hash collision resolution algorithms include separate chaining, open addressing, coalesced hashing, cuckoo hashing, etc.

According to one embodiment, table generator 121 generates hash table 123 by determining load factor 134 such that hash table 123 satisfies performance requirements 108. Generally, a low load factor implies good performance. As used herein, a "load factor" refers to the number of entries (i.e., items added to the table) divided by the number of buckets. If the load factor is kept reasonably low, the hash table should perform well, provided the hashing is good. If the load factor grows too large, the hash table will become slow, or it may fail to work altogether. The expected constant time property of a hash table assumes that the load factor is kept below some bound. For a fixed number of buckets, the time for a lookup grows with the number of entries and so does not achieve the desired constant time.

According to one embodiment, table generator 121 is to resize hash table 123 in order to maintain a low/acceptable load factor. For example, as entries are added to hash table 123, table generator 121 expands hash table 123 (e.g., by adding more buckets) in order to maintain determined load factor 132. In one embodiment, in order to minimize memory consumption, as entries are removed from hash table 123, table generator 121 is also operable to shrink hash table 123. In this way, table generator 121 does not waste memory by maintaining a load factor that is unnecessarily too low. It should also be noted that a low load factor is not always beneficial. As the load factor approaches 0, the proportion of unused areas in the hash table increases, but there is not necessarily any reduction in search cost. This results in wasted memory.

As described above, the performance of hash table 123 is defined by its hash function 132, collision resolution algorithm 133, load factor 134, or any combination thereof. In one embodiment, table generator 121 determines hash function 132, collision resolution algorithm 133, load factor 134, or any combination thereof, such that hash table 123 can complete a search and collision resolution (if necessary) within a number of steps that is not greater than the time complexity included in performance requirements 108.

Throughout the description, table generator 121 is described as generating trie trees (e.g., trie tree 122) and hash tables (e.g., hash table 123). The mechanisms for controlling forwarding table performance of the present invention, however, are not so limited. One having ordinary skill in the art would recognize that the present techniques apply equally to all other types of lookup table with parameters that can be configured to achieve different performance. For example, table generator 121 can utilize performance requirements 108 to generate other forwarding tables 124.

Throughout the description, the performance requirement of each forwarding table (e.g., trie tree 122, hash table 123, and other forwarding tables 124) is described as being determined/controlled based on the overall performance requirement of all forwarding tables in forwarding plane 106. One having ordinary skill in the art would recognize, however, that the present mechanisms for controlling forwarding table performance is not so limited. For example, the performance requirement of an individual forwarding table may be determined/controlled based on an overall performance requirement of only a subset of the forwarding tables in forwarding plane 106. By way of further example, the performance requirement of an individual forwarding table may be determined/controlled irrespective of any other performance requirements.

The mechanisms for distributing performance requirements have been described with respect to network device 101. It shall be understood that the mechanisms can be implemented in any network device of control plane 105. Further, the mechanisms for generating forwarding tables based on the distributed performance requirements are not limited to network device 103. One with ordinary skill in the art would recognize that the mechanisms can be implemented in any network device of forwarding plane 106.

FIG. 3 is a flow diagram illustrating a method for distributing performance requirements of forwarding tables according to one embodiment. For example, method 300 can be implemented by control plane 105 (e.g., performance controller 111 of network device 101 of control plane 105) and forwarding plane 106 (e.g., table generator 121 of network device 103 of forwarding plane 106). Method 300 can be implemented in software, firmware, hardware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 3. At block 305, the performance controller creates a first logical forwarding table and determines a first performance requirement of the first logical forwarding table based on an overall performance requirement of a plurality of forwarding tables (e.g., trie tree 122, hash table 123, and other forwarding tables 124) in the forwarding plane. Here, "creating a logical forwarding table" refers to the control plane creating logical information (e.g., routing information) that is to be used by the forwarding plane to generate the forwarding table.

At block 310, the performance controller determines whether the first forwarding table (e.g., trie tree 122) can be generated by the forwarding plane to satisfy the first performance requirement. In one embodiment, the performance controller determines whether the first forwarding table can be generated by the forwarding plane to satisfy the first performance requirement by querying the forwarding plane (e.g., by sending a message to the network device in the forwarding responsible for generating the first forwarding table). Alternatively, the performance controller can perform this determination based on information preconfigured (e.g., by a network administrator) at the performance controller. At block 315, in response to determining the first forwarding table can be generated to satisfy the first performance requirement, the performance controller includes the first performance requirement in the first logical forwarding table. At block 320, the performance controller sends the first logical forwarding table to the forwarding plane. In other words, the performance controller sends logical information (e.g., routing information) and the performance requirements to the forwarding plane, so that the forwarding plane can generate the first forwarding table that satisfies the first performance requirement.

At block 325, in response to determining the first forwarding table cannot be generated to satisfy the first performance requirement, the performance controller determines whether to proceed (e.g., based on configuration by a user/administrator of the network). At block 330, in response to determining not to proceed, the performance controller generates an alert (e.g., to inform the network administrator that the first forwarding table cannot be generated to satisfy the required performance). Alternatively, if at block 325 the performance controller determines to proceed even though the first forwarding table cannot be generated to satisfy the first performance requirement, the performance controller transitions to block 320 and sends the first forwarding table without the first performance requirement.

At block 335, in response to receiving the first logical forwarding table with the first performance requirement, the table generator selects a type of forwarding table (which can be based on information included as part of the received first performance requirement) to generate.

At block 340, the table generator determines to generate a trie tree (e.g., trie tree 122) with a depth such that the trie tree satisfies the first performance requirement, using mechanisms similar to those described above. For example, the table generator can determine the depth by setting it to the time complexity included in the received first performance requirement. At block 345, the table generator determines to generate a hash table (e.g., hash table 123) with a hash function, load factor, a collision resolution algorithm, or any combination thereof, such that the hash table satisfies the first performance requirement, using mechanisms similar to those described above. For example, the table generator may select a hashing function, collision resolution algorithm, load factor, or any combination thereof, such that the number of steps to perform a search and resolve any potential collision is no more than the time complexity included in the first performance requirement. At block 350, the table generator may generate any implementation-specific lookup table such that the lookup table can satisfy the first performance requirement. One having ordinary skill in the art would recognize that the operations described above can be repeated for each of the forwarding tables implemented in the forwarding plane.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

According to one embodiment, one or more of control communication and configuration module(s) 432A-R include a performance controller for performing operations similar to those performed by performance controller 111. For example, control communication and configuration module 432A includes performance controller 435A for performing operations similar to those performed by performance controller 111. According to one embodiment, one or more of network element(s) 430A-R includes a table generator for performing operations similar to those performed by table generator 121. For example, network element 430A includes table generator 437A for performing operations similar to those performed by table generator 121.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)).

According to one embodiment, one or more of virtual machines 462A-R includes a performance controller for performing operations similar to those performed by performance controller 111. For example, virtual machine 462A includes performance controller 463A for performing operations similar to those performed by performance controller 111. According to one embodiment, one or more of virtual machines 462A-R includes a table generator for performing operations similar to those performed by table generator 121. For example, virtual machine 462A includes table generator 464A for performing operations similar to those performed by table generator 121.

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 4C:
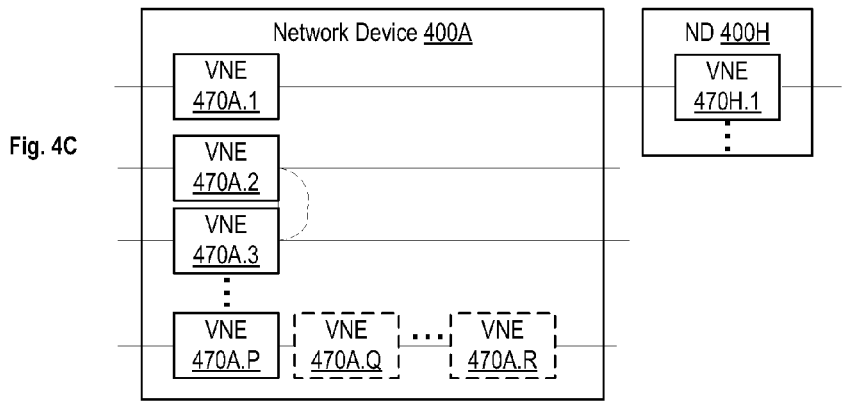
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the virtual machines 462A-R may operate as servers; the same would be true for the hybrid network device 406; in the case of the special-purpose network device 402, one or more such servers could also be run on a hypervisor executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 4D:
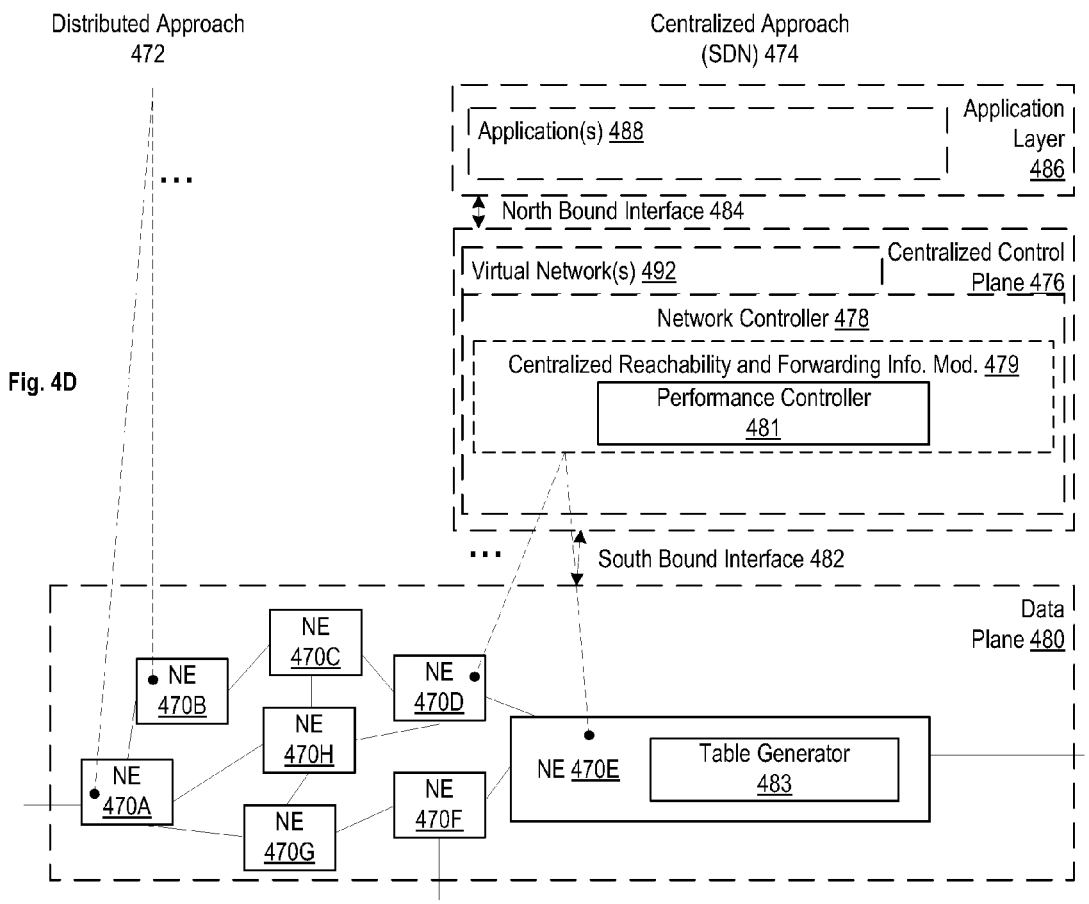
FIG. 4D illustrates a network with a single network element (NE) on each of the NDs of FIG. 4A, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482. Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach). According to one embodiment, centralized reachability and forwarding information module 479 includes performance controller 481 for performing operations similar to those performed by performance controller 111.

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

According to one embodiment, one or more of NE 470A-H includes a table generator for performing operations similar to those performed by table generator 121. For example, NE 470E includes table generator 483 for performing operations similar to those performed by table generator 121.

Figure 4E:
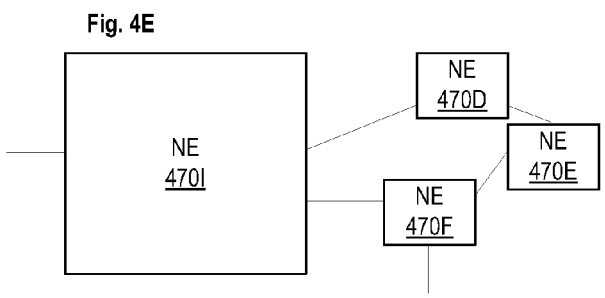
FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 470I in one of the virtual network(s) 492 of FIG. 4D, according to some embodiments of the invention.
Figure 4F:
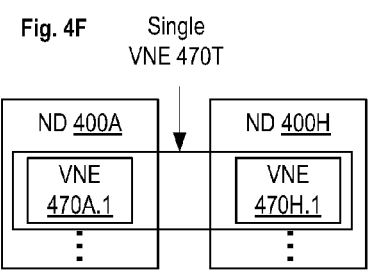
FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention.

Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
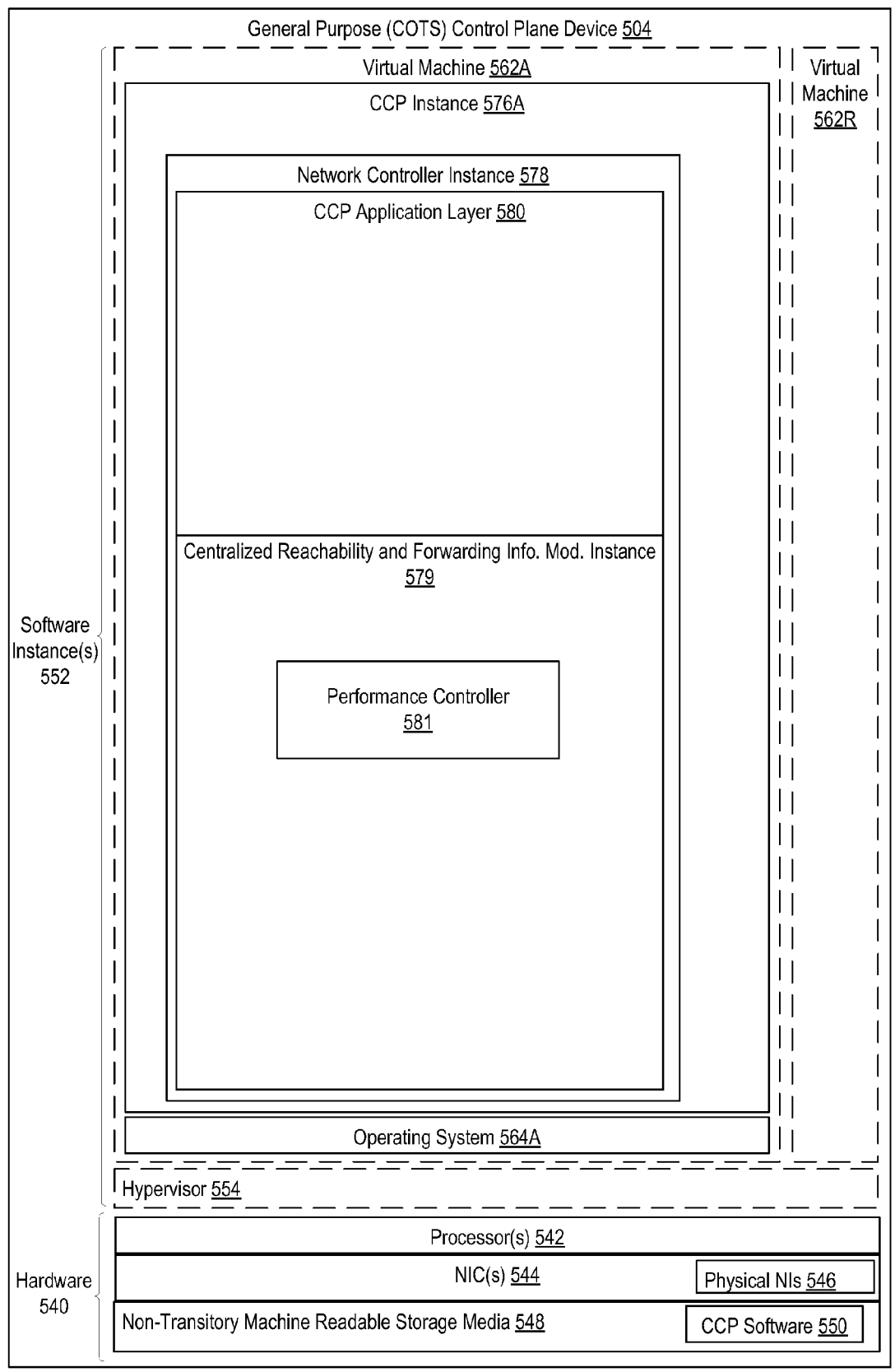
FIG. 5 illustrates a general purpose control plane device 504 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller 478 to the operating system 564A and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view. According to one embodiment, centralized reachability and forwarding information module instance 579 includes performance controller 581 for performing operations similar to those performed by performance controller 111.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Various commonly known standards define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss") arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet.

Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device operating in a control plane for distributing performance requirements to a second network device operating in a forwarding plane, the method comprising:

determining a first performance requirement of a first forwarding table in the forwarding plane based on a performance requirement of a plurality forwarding tables in the forwarding plane;

determining whether the first forwarding table in the forwarding plane can be generated to satisfy the first performance requirement; and in response to determining the first forwarding table in the forwarding plane can be generated to satisfy the first performance requirement, sending a first message that includes the first performance requirement to the second network device, wherein the first performance requirement in the first message indicates a time complexity, the first message causing the second network device to generate the first forwarding table that satisfies the first performance requirement.

2. The method of claim 1, wherein the first forwarding table is a trie tree, and wherein the first message causes the second network device to generate the trie tree with a depth such that the trie tree satisfies the first performance requirement.

3. The method of claim 1, wherein the first forwarding table is a hash table, and wherein the first message causes the second network device to generate the hash table with a load factor such that the hash table satisfies the first performance requirement.

4. The method of claim 1, wherein the first forwarding table is a hash table, and wherein the first message causes the second network device to generate the hash table with a collision resolution algorithm such that the hash table satisfies the first performance requirement.

5. The method of claim 1, further comprising:

in response to determining the first forwarding table is causing the plurality of forwarding tables in the forwarding plane to fail to satisfy the performance requirement of the plurality forwarding tables after the first forwarding table has been generated based on the first performance requirement, determining a second performance requirement of the first forwarding table, wherein the second performance requirement requires a lower time complexity than the first performance requirement; and sending a second message that includes the second performance requirement to the second network device, the second message causing the second network device to re-generate the first forwarding table to satisfy the second performance requirement.

6. A first network device operating in a control plane for distributing performance requirements to a second network device operating in a forwarding plane, the first network device comprising:
a set of one or more processors; and
a non-transitory machine-readable storage medium containing code, which when executed by the set of one or more processors, cause the first network device to:
determine a first performance requirement of a first forwarding table in the forwarding plane based on a performance requirement of a plurality forwarding tables in the forwarding plane,
determine whether the first forwarding table in the forwarding plane can be generated to satisfy the first performance requirement, and
in response to determining the first forwarding table in the forwarding plane can be generated to satisfy the first performance requirement, send a first message that includes the first performance requirement to the second network device, wherein the first performance requirement in the first message indicates a time complexity, the first message causing the second network device to generate the first forwarding table that satisfies the first performance requirement.

7. The first network device of claim 6, wherein the first forwarding table is a trie tree, and wherein the first message causes the second network device to generate the trie tree with a depth such that the trie tree satisfies the first performance requirement.

8. The first network device of claim 6, wherein the first forwarding table is a hash table, and wherein the first message causes the second network device to generate the hash table with a load factor such that the hash table satisfies the first performance requirement.

9. The first network device of claim 6, wherein the first forwarding table is a hash table, and wherein the first message causes the second network device to generate the hash table with a collision resolution algorithm such that the hash table satisfies the first performance requirement.

10. The first network device of claim 6, wherein the non-transitory machine-readable storage medium further contains code, which when executed by the set of one or more processors, cause the first network device to:
in response to determining the first forwarding table is causing the plurality of forwarding tables in the forwarding plane to fail to satisfy the performance requirement of the plurality forwarding tables after the first forwarding table has been generated based on the first performance requirement, determine a second performance requirement of the first forwarding table, wherein the second performance requirement requires a lower time complexity than the first performance requirement; and
send a second message that includes the second performance requirement to the second network device, the second message causing the second network device to re-generate the first forwarding table to satisfy the second performance requirement.

11. A non-transitory computer-readable storage medium having computer code stored therein, which when executed by a processor of a first network device operating in a control plane for distributing performance requirements to a second network device operating in a forwarding plane, cause the first network device to perform operations comprising:

determining a first performance requirement of a first forwarding table in the forwarding plane based on a performance requirement of a plurality forwarding tables in the forwarding plane;
determining whether the first forwarding table in the forwarding plane can be generated to satisfy the first performance requirement; and
in response to determining the first forwarding table in the forwarding plane can be generated to satisfy the first performance requirement, sending a first message that includes the first performance requirement to the second network device, wherein the first performance requirement in the first message indicates a time complexity, the first message causing the second network device to generate the first forwarding table that satisfies the first performance requirement.

12. The non-transitory computer-readable storage medium of claim 11, wherein the first forwarding table is a trie tree, and wherein the first message causes the second network device to generate the trie tree with a depth such that the trie tree satisfies the first performance requirement.

13. The non-transitory computer-readable storage medium of claim 11, wherein the first forwarding table is a hash table, and wherein the first message causes the second network device to generate the hash table with a load factor such that the hash table satisfies the first performance requirement.

14. The non-transitory computer-readable storage medium of claim 11, wherein the first forwarding table is a hash table, and wherein the first message causes the second network device to generate the hash table with a collision resolution algorithm such that the hash table satisfies the first performance requirement.

15. The non-transitory computer-readable storage medium of claim 11, wherein the computer code, when executed by the processor of the first network device, cause the first network device to perform further operations comprising:
in response to determining the first forwarding table is causing the plurality of forwarding tables in the forwarding plane to fail to satisfy the performance requirement of the plurality forwarding tables after the first forwarding table has been generated based on the first performance requirement, determining a second performance requirement of the first forwarding table, wherein the second performance requirement requires a lower time complexity than the first performance requirement; and
sending a second message that includes the second performance requirement to the second network device, the second message causing the second network device to re-generate the first forwarding table to satisfy the second performance requirement.

16. A method in a first network device operating in a forwarding plane for generating forwarding tables based on performance requirements received from a second network device operating in a control plane, the method comprising:
receiving a first message that includes a first performance requirement of a first forwarding table from the second network device, wherein the first performance requirement in the first message indicates a time complexity; and
generating the first forwarding table that satisfies the first performance requirement included in the first message.

17. The method of claim 16, wherein generating the first forwarding table comprises:

generating a trie tree with a depth such that the trie tree satisfies the first performance requirement included in the first message.

18. The method of claim 16, wherein generating the first forwarding table comprises:
generating a hash table with a load factor such that the hash table satisfies the first performance requirement included in the first message.

19. The method of claim 16, wherein generating the first forwarding table comprises:
generating a hash table with a collision resolution algorithm such that the hash table satisfies the first performance requirement included in the first message.

20. A first network device operating in a forwarding plane for generating forwarding tables based on performance requirements received from a second network device operating in a control plane, the first network device comprising:
a set of one or more processors; and
a non-transitory machine-readable storage medium containing code, which when executed by the set of one or more processors, cause the first network device to:
receive a first message that includes a first performance requirement of a first forwarding table from the second network device, wherein the first performance requirement in the first message indicates a time complexity, and
generate the first forwarding table that satisfies the first performance requirement included in the first message.

21. The first network device of claim 20, wherein generating the first forwarding table comprises the first network device to:
generate a trie tree with a depth such that the trie tree satisfies the first performance requirement included in the first message.

22. The first network device of claim 20, wherein generating the first forwarding table comprises the first network device to:
generate a hash table with a load factor such that the hash table satisfies the first performance requirement included in the first message.

23. The first network device of claim 20, wherein generating the first forwarding table comprises the first network device to:
generate a hash table with a collision resolution algorithm such that the hash table satisfies the first performance requirement included in the first message.

24. A non-transitory computer-readable storage medium having computer code stored therein, which when executed by a processor of a first network device operating in a forwarding plane for generating forwarding tables based on performance requirements received from a second network device operating in a control plane, cause the first network device to perform operations comprising:
receiving a first message that includes a first performance requirement of a first forwarding table from the second network device, wherein the first performance requirement in the first message indicates a time complexity; and
generating the first forwarding table that satisfies the first performance requirement included in the first message.

25. The non-transitory computer-readable storage medium of claim 24, wherein generating the first forwarding table comprises:
generating a trie tree with a depth such that the trie tree satisfies the first performance requirement included in the first message.

26. The non-transitory computer-readable storage medium of claim 24, wherein generating the first forwarding table comprises:
generating a hash table with a load factor such that the hash table satisfies the first performance requirement included in the first message.

27. The non-transitory computer-readable storage medium of claim 24, wherein generating the first forwarding table comprises:
generating a hash table with a collision resolution algorithm such that the hash table satisfies the first performance requirement included in the first message.

28. A method in a virtual machine operating in a control plane for distributing performance requirements to a network device operating in a forwarding plane, the method comprising:
determining a first performance requirement of a first forwarding table in the forwarding plane based on a performance requirement of a plurality forwarding tables in the forwarding plane;
determining whether the first forwarding table in the forwarding plane can be generated to satisfy the first performance requirement; and
in response to determining the first forwarding table in the forwarding plane can be generated to satisfy the first performance requirement, sending a first message that includes the first performance requirement to the network device, wherein the first performance requirement in the first message indicates a time complexity, the first message causing the network device to generate the first forwarding table that satisfies the first performance requirement.

29. The method of claim 28, wherein the first forwarding table is a trie tree, and wherein the first message causes the network device to generate the trie tree with a depth such that the trie tree satisfies the first performance requirement.

30. The method of claim 28, wherein the first forwarding table is a hash table, and wherein the first message causes the network device to generate the hash table with a load factor such that the hash table satisfies the first performance requirement.

31. The method of claim 28, wherein the first forwarding table is a hash table, and wherein the first message causes the network device to generate the hash table with a collision resolution algorithm such that the hash table satisfies the first performance requirement.

32. The method of claim 28, further comprising:
in response to determining the first forwarding table is causing the plurality of forwarding tables in the forwarding plane to fail to satisfy the performance requirement of the plurality forwarding tables after the first forwarding table has been generated based on the first performance requirement, determining a second performance requirement of the first forwarding table, wherein the second performance requirement requires a lower time complexity than the first performance requirement; and
sending a second message that includes the second performance requirement to the network device, the second message causing the network device to re-generate the first forwarding table to satisfy the second performance requirement.

* * * * *